United States Patent
Canat et al.

(10) Patent No.: US 9,653,875 B2
(45) Date of Patent: May 16, 2017

(54) DEVICE COMPRISING AN OPTICAL FIBER HAVING A HIGH BRILLOUIN THRESHOLD AND METHOD FOR MANUFACTURING SUCH A DEVICE

(71) Applicant: Office National d'Etudes et de Recherches Aérospatiales—ONERA, Palaiseau (FR)

(72) Inventors: Guillaume Canat, Villebon sur Yvette (FR); William Renard, Paris (FR); Laurent Lombard, Paris (FR); Didier Fleury, Clamart (FR)

(73) Assignee: Office National d'Etudes et de Recherches Aérospatiales—ONERA, Palaiseau (FR)

( * ) Notice: Subject to any disclaimer, the term of this patent is extended or adjusted under 35 U.S.C. 154(b) by 0 days.

(21) Appl. No.: 15/113,208

(22) PCT Filed: Jan. 23, 2015

(86) PCT No.: PCT/EP2015/051377
§ 371 (c)(1),
(2) Date: Jul. 21, 2016

(87) PCT Pub. No.: WO2015/110590
PCT Pub. Date: Jul. 30, 2015

(65) Prior Publication Data
US 2017/0012401 A1    Jan. 12, 2017

(30) Foreign Application Priority Data

Jan. 24, 2014 (FR) ..................... 14 50627

(51) Int. Cl.
*H01S 3/094* (2006.01)
*H01S 3/067* (2006.01)
*G02B 6/02* (2006.01)

(52) U.S. Cl.
CPC .......... *H01S 3/094049* (2013.01); *G02B 6/02* (2013.01); *H01S 3/06704* (2013.01);
(Continued)

(58) Field of Classification Search
CPC ............. H01S 3/06704; H01S 3/06729; H01S 3/06754; H01S 3/06783; H01S 3/094049; G02B 6/02
See application file for complete search history.

(56) References Cited

U.S. PATENT DOCUMENTS

| 5,136,673 A | 8/1992 | Yoshizawa et al. |
| 5,509,097 A * | 4/1996 | Tondi-Resta ......... G02B 6/4403 385/109 |

(Continued)

OTHER PUBLICATIONS

International Search Report issued in corresponding application No. PCT/EP2015/051377 mailed Apr. 28, 2015 (6 pages)
(Continued)

*Primary Examiner* — Eric Bolda
(74) *Attorney, Agent, or Firm* — Osha Liang LLP

(57) ABSTRACT

According to one aspect, the invention relates to a device comprising an optical fiber having a high Brillouin threshold, said device including an optical fiber (101) suitable for propagating a high-power optical signal beam, means (11) for coupling a signal beam to an entrance end of the optical fiber (101) and a tubular structure (10) comprising at least one first tube (103) and at least one first adhesive material (102). According to the present description, at least one portion of the optical fiber is immobilized in the tubular structure (10) by means of the first adhesive material (102), which adheres both to the internal surface of the first tube (103) and to the external surface of the optical fiber (101). Furthermore, at room temperature and with no other external stresses on the device, the immobilized portion of the optical fiber (101) is maintained in a compressive state by the
(Continued)

tubular structure, the compressive state being such that the relative deformation of the optical fiber is negative or zero in its portion immobilized in the tubular structure, the maximum value of the relative deformation of the immobilized portion of the optical fiber being higher in absolute value than 0.3%.

20 Claims, 7 Drawing Sheets

(52) U.S. Cl.
CPC ...... *H01S 3/06729* (2013.01); *H01S 3/06783* (2013.01); *H01S 3/06754* (2013.01); *H01S 2301/03* (2013.01)

(56) References Cited

U.S. PATENT DOCUMENTS

| | | | |
|---|---|---|---|
| 2003/0127587 A1* | 7/2003 | Udd | G01L 1/246 250/227.14 |
| 2004/0223707 A1* | 11/2004 | Parsons | G02B 6/14 385/100 |
| 2007/0019918 A1 | 1/2007 | Rothenberg | |
| 2013/0209044 A1* | 8/2013 | Lowell | G02B 6/443 385/101 |
| 2015/0194787 A1* | 7/2015 | Canat | H01S 3/06754 359/334 |

OTHER PUBLICATIONS

Written Opinion of the International Searching Authority issued in corresponding application No. PCT/EP2015/051377 mailed Apr. 28, 2015 (6 pages).

French Search Report issued in corresponding application No. FR1450627 dated Sep. 22, 2014 (2 pages).

Yoshizawa et al., "Stimulated Brillouin Scattering Suppression by Means of Applying Strain Distribution to Fiber with Cabling"; Journal of Lightwave Technology, IEEE Service Center, vol. 11, No. 10, pp. 1518-1522; Oct. 1, 1993 (5 pages).

* cited by examiner

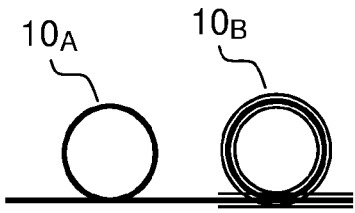
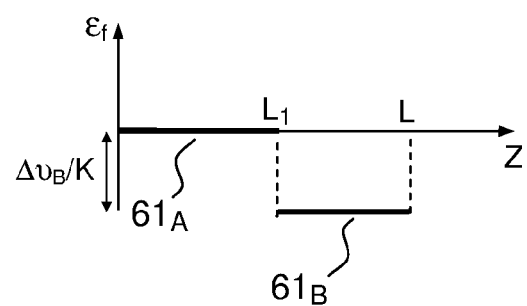
FIG.6A                FIG.6B
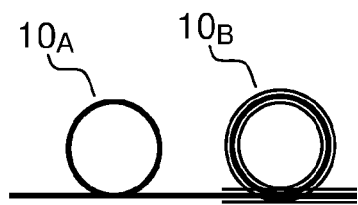
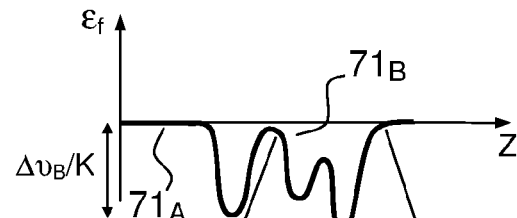
FIG.7A
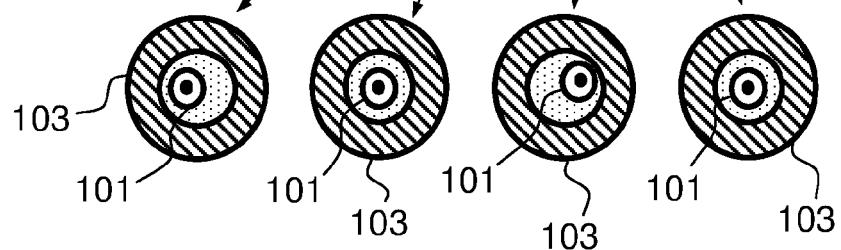
FIG.7B

DEVICE COMPRISING AN OPTICAL FIBER HAVING A HIGH BRILLOUIN THRESHOLD AND METHOD FOR MANUFACTURING SUCH A DEVICE

PRIOR ART

Technical Field of the Invention

The present invention relates to a fiber-optic device having a high Brillouin threshold and a method of manufacturing such a device. The invention notably applies to fiber-optic amplifiers or to fiber-optic devices intended to transport information.

Prior Art

In fiber-optic communication systems and in fiber-optic amplifiers an incident laser beam that is spectrally thin (i.e. of single frequency or of spectral width less than 100 GHz), referred to in the remainder of the description as the signal beam, is coupled into an optical fiber. In the case of optical communication systems, the signal beam must be of high optical power to be transmitted over long distances. In the case of fiber-optic amplifiers, the signal beam is amplified in an amplifying optical fiber by means of a laser beam referred to as the pump beam.

Thus FIGS. 1A and 1B show two examples of amplifiers 100 including an amplifying optical fiber 10 and operating in copropagative and contrapropagative mode, respectively. The device for coupling the signal beam that is to be amplified includes in the examples from FIGS. 1A and 1B fiber-optic coupling elements such as a connector 11, for example. Alternatively, the signal beam or the pump beam may be coupled into the amplifying fiber by non-fiber-optic optical elements. The amplifier 100 may include other fiber-optic passive optical elements, for example an isolator, a filter, one or more connectors. In the example shown in FIGS. 1A and 1B, an isolator 12 is arranged between the connector 11 and the amplifying fiber 10 for example by means of welds 15. The amplifier 100 may notably include a fiber optical element including a passive optical fiber cord 17 at the exit of the amplifying fiber 10. The fiber element is for example a connector 14 making it possible to direct the amplified beam to other optical components intended to collimate or to focus the amplified beam. In the same way a coupling device 13 makes it possible to couple the pump beam into the fiber. The pump beam is for example obtained from a laser source such as a laser diode. In the case of copropagative pumping, the same coupling optical component can be used to couple the signal beam and the pump beam.

Whether in the case of an optical fiber intended to transport a high-power beam or a fiber-optic amplifier as shown in FIG. 1A or FIG. 1B, for example, saturation of the transmitted optical power may be observed beyond a threshold optical power ($P_{th}$) if the spectral width of the laser is small (typically less than 100 GHz) because of a non-linear effect in the fiber referred to as stimulated Brillouin scattering (SBS).

To be more precise, beyond the threshold optical power, referred to as the Brillouin threshold, the additional optical power is reflected in the form of a so-called Stokes wave resulting from the interaction of the incident wave with self-generated acoustic waves that propagate in the optical fiber. In the remainder of the application the Brillouin threshold is defined as the output power of the device such that the power backscattered by stimulated Brillouin scattering reaches 10% of the output power of the device. The Stokes wave is generated by amplification of the photons resulting from quantum noise propagating in the opposite direction to the signal beam. It has an optical frequency $v_s$ shifted in frequency (by the Doppler effect) in accordance with the equation $v_s = v - v_B$ where $v$ is the frequency of the incident wave and $v_B$, referred to as the Brillouin frequency, is the frequency of the acoustic wave (approximately 11 GHz for a 1.5 µm signal beam). The corresponding gain curve has a Lorentz general shape centered around $v_B$ and between $\Delta v_B \sim 20$ MHz and $\Delta v_B \sim 200$ MHz wide (typically 40 MHz wide). It is easy to measure the spectrum of the backscattered Stokes wave. Below the limit whereby the gain to which the Stokes photons is subjected is low (typically less than $10^5$), the spectrum of the Stokes wave is proportional to the spectrum of the Brillouin gain. The Brillouin frequency $v_B$ is a function of the local speed of the acoustic waves in the fiber. It is established in the literature that $v_B$ depends on the composition of the fiber, its relative longitudinal deformation state $\epsilon$ and temperature. The relative longitudinal deformation $\epsilon$ of a fiber element of initial length $L_0$ and of length $L$ in its deformed state is given by $\epsilon = L/L_0 - 1$. Hereinafter $\epsilon$ is simply designated the strain.

Numerous publications have proposed techniques for reducing the SBS effect in fiber-optic devices. In particular, by varying $v_B$ along the fiber, the threshold at which the SBS effect appears is raised because the amplification of the Stokes wave is cumulative only in the gain band $\Delta v_B$. There has therefore been proposed (see R. Engelbrecht et al. "SBS shaping and suppression by arbitrary strain distributions realized by a fiber coiling machine", *IEEE/LEOS Winter Topicals Meeting Series,* 2009, paper WC1.3., pp. 248-249, 12-14 Jan. 2009) a machine for coiling an optical fiber with an elongation profile that is variable along the fiber. The paper describes how a passive optical fiber may be coiled onto a cylinder and the tension applied during coiling varied with a computer-controlled paying out device, making possible a widening of the Brillouin gain curve accompanied by a significant raising of the Brillouin threshold.

Thus FIG. 2 shows the spectrum of the power backscattered by SBS that is proportional to the Brillouin gain of a 5 m Corning® Panda PM1550 fiber without stress (curve 21) and the same fiber but when a length of 2.5 m is subjected to a strain of +0.6% (curve 22). The wavelength used in this example is 1545 nm. A variation of the Brillouin frequency $v_B$ is observed in the curve 22; the variation $\delta v_B$ of the Brillouin frequency $v_B$ of a fiber subjected to a strain $\epsilon$ is proportional to the strain $\epsilon$ in accordance with the equation $\delta v_B = K \epsilon$.

Although most devices described in the prior art are devices with a variable elongation of the fiber to raise the Brillouin threshold, it is equally interesting to seek to operate with the fiber in compression, because the maximum stress that an optical fiber can withstand in compression before it breaks is much higher than in elongation (approximately 20 times higher).

Thus U.S. Pat. No. 5,136,673 describes a fiber-optic device for long-distance communications with a high Brillouin threshold and a method of manufacturing such a device. In that document, a plurality of optical fibers having variable elongation are fixed around a central cable that is itself under tension, the cable thereafter being released. By ensuring that the mean elongation of the optical fibers is greater than the tension of the cable, a structure is obtained in which the optical fibers have a variable longitudinal stress profile in tension and in compression, the absolute value of the strain $\epsilon$ in compression remaining limited to less than 0.2%.

It is in fact known that compression stresses applied to an optical fiber lead, beyond a certain threshold, to a phenomenon referred to as "buckling" reflected in flexing of the fiber in a direction perpendicular to the compression axis, which flexing can induce high optical losses (see for example M. H. Reeves et al., "Investigation of optical fiber buckling in loose-tube packaging", Electronics Letters, Vol. 14, N° 3, 1978). The device described in U.S. Pat. No. 5,136,673 therefore proposes to maintain the optical fibers in a moderate tension stress, which has the disadvantage of accelerating their wear, or maintaining optical fibers in a compression stress state limited to an absolute value less than 0.2% to prevent buckling, which has the disadvantage of limiting the possible raising of the Brillouin threshold, however.

An object of the invention is to propose a fiber-optic device that has a high Brillouin threshold without the limitations of the prior art. In particular, an object of the invention is to propose a fiber-optic device operating at room temperature in which a compressive stress is applied to the optical fiber in order to raise the Brillouin threshold at the same time as limiting the phenomenon of buckling. Another object of the invention is to propose a simple method of manufacturing such a device.

SUMMARY OF THE INVENTION

In accordance with a first aspect, the present application relates to a fiber-optic device having a high Brillouin threshold including an optical fiber suitable for the propagation of a signal beam of high optical power and having an external surface, and means for coupling a signal beam into an entry end of the optical fiber. The device further comprises a tubular structure including at least one first tube with an internal surface and at least one first adhesive material, such that:
  at least one portion of the optical fiber is immobilized in the tubular structure by means of the first adhesive material, adhering to the internal surface of the first tube and to the external surface of the optical fiber;
  at room temperature and with no other external stresses on the device, the immobilized portion of the optical fiber is maintained in a compressive state by the tubular structure, such that the strain of the optical fiber is negative or zero in its portion immobilized in the tubular structure, the maximum absolute value of the strain of the immobilized portion of the optical fiber being greater than 0.3%.

The applicants have shown that a tubular structure formed in this way for immobilizing the optical fiber made it possible to achieve large negative strains of the optical fiber without buckling and therefore significant raising of the Brillouin threshold in fiber-optic devices intended to transport signals of high optical power, notably fiber-optic amplifiers and fibers intended for high peak power transport such as cords.

In accordance with an embodiment, the immobilized portion of the optical fiber has a compressive state with a strain profile that is variable along said immobilized portion of the optical fiber. This reduces the effective length over which the Brillouin amplification is cumulative compared to a situation in which the fiber undergoes constant deformation.

In accordance with an embodiment, the strain profile of the optical fiber is such that the strain of the immobilized portion of the optical fiber is comprised between −0.3% and 0.3% in the vicinity of each end of the optical fiber. This embodiment makes it possible to reduce the shear forces that may be exerted at the interfaces between the various layers and thus to reduce the risk of delamination.

In accordance with an embodiment, the Young's modulus of the first adhesive material is greater than or equal to 200 MPa, advantageously 500 MPa. The applicant has shown that by choosing a sufficiently rigid adhesive material the optical fiber is able to withstand large negative strains (exceeding 0.7% in absolute value) without buckling.

In accordance with an embodiment, the first adhesive material may be polymerized by light radiation of given activation wavelength and the first tube is at least partially transparent at said activation wavelength, typically having a transparency greater than 30%.

In accordance with an embodiment, $E_1$, $E_2$, $E_3$ being the respective equivalent Young's moduli of the optical fiber, the first adhesive material and the first tube and $S_1$, $S_2$, $S_3$ being the respective equivalent sections of the optical fiber, the first adhesive material and the first tube, the condition $E_1 S_1 + E_2 S_2 < E_3 S_3$ is complied with. The choice of these parameters makes it possible to generate high strains in compression of the optical fiber.

In accordance with an embodiment, the bending stiffness of the tubular structure is less than 10000 N·mm$^2$, which makes it possible to preserve the flexibility of the tubular structure containing the fiber.

In accordance with an embodiment, the material forming the first tube belongs to the family of polycarbonates or polyamides. These materials have a high elastic limit (greater than 1%), a high Young's modulus (greater than 1 GPa) and a low stiffness in bending, making it possible to maintain a low modulus of stiffness for the tubular structure (typically less than 50000 N·mm$^2$, or even less than 10000 N·mm$^2$).

In accordance with an embodiment, the tubular structure includes at least one second tube and at least one second adhesive material, such that:
  the first tube is immobilized in the second tube by means of the second adhesive material, adhering to the internal surface of the second tube and to the external surface of the first tube;
  at room temperature and with no other exterior stresses on the device, the first tube is maintained in a compressive state by at least said second tube.

Such an arrangement of the tubular structure makes it possible to increase the compressive stress on the optical fiber situated at the center of the structure.

In accordance with an embodiment, the tubular structure further includes reinforcing elements contributing to maintaining the optical fiber in said compressive state, the reinforcing elements being positioned in the internal space formed between the external surface of the optical fiber and the internal surface of the tube and immobilized by means of said first adhesive material. Once again, it is possible thanks to the reinforcing elements to increase the compressive stress on the optical fiber.

In accordance with an embodiment, the optical fiber is a fiber suitable for transporting a light beam and the compressive state of said optical fiber has a triangular profile with a maximum absolute value at a point situated at a position $L_1 = x \cdot L$ where $0.4 \leq x \leq 0.6$.

In accordance with an embodiment, the optical fiber being an amplifying optical fiber of given length L, comprising a core and a cladding, and being adapted to amplify a signal being propagating in said core, the device further includes means for coupling a pump beam for pumping said amplifying optical fiber.

In accordance with an embodiment, the pump beam coupling means are adapted to pump the amplifying optical fiber in a copropagative configuration in the cladding and the compressive state of the amplifying optical fiber has a triangular profile with a maximum absolute value at a point situated at a position $L_1 = x \cdot L$ where $0.4 \leq x \leq 0.6$.

In accordance with an alternative embodiment, the pump beam coupling means are adapted to pump the amplifying optical fiber in a contrapropagative configuration in the cladding or to pump the amplifying optical fiber in a copropagative or contrapropagative configuration in the core and the compressive state of the amplifying optical fiber has a triangular profile with a maximum absolute value at a point situated at a position $L_1 = x \cdot L$ where $0.5 \leq x \leq 0.9$.

In accordance with a second aspect, the invention relates to an amplified master oscillator system including a laser emission source of a signal beam, a laser emission source of a pump beam and a fiber-optic device in accordance with the first aspect intended to amplify said signal beam wherein said pump beam is coupled to the amplifying optical fiber of the device.

In accordance with a third aspect, the invention relates to a method of manufacturing a fiber-optic device having a high Brillouin threshold including:
- placing a portion of at least one optical fiber in an internal space of a first tube of a tubular structure;
- stretching at least a portion of the tubular structure;
- filling the internal space of the first tube with a polymerizable first adhesive material;
- polymerizing the first adhesive material;
- releasing the stretched portion of the tubular structure, leading to compression of the optical fiber.

It is therefore possible with a simple method of manufacture to achieve very high compressive stresses on the optical fiber with no risk of buckling.

In accordance with an embodiment, the first adhesive material is polymerized area by area and said stretched portion of the tubular structure is released as the area of polymerization of the first adhesive material moves.

In accordance with another embodiment, the internal space of the tubular structure is filled with the first adhesive material before stretching the tubular structure, the first adhesive material is polymerized area by area and the tubular structure is stretched as the area of polymerization of the first adhesive material is moved.

In accordance with an embodiment, the stretching of at least a portion of the tubular structure includes stretching the first tube.

In accordance with an embodiment, the method further comprises after polymerizing the first adhesive material and releasing the stretched first tube:
- placing the first tube in an internal space of a second tube of the tubular structure;
- stretching the second tube;
- filling the internal space of the second tube with a polymerizable second adhesive material;
- polymerizing the second adhesive material;
- releasing the stretched second tube, leading to compression of the first tube.

In accordance with an embodiment, the method further comprises placing in the internal space of the first tube at least one reinforcing element, stretching at least a portion of the tubular structure including stretching the reinforcing element or elements.

BRIEF DESCRIPTION OF THE DRAWINGS

Other advantages and features of the invention will become apparent on reading the description illustrated by the following figures:

FIGS. 6A and 6B, respectively a partial view of an example of a fiber-optic device in accordance with the present description and a curve representing an example of a strain axial profile of an optical fiber of a device according to FIG. 6A;

FIGS. 7A and 7B, respectively a partial view of an example of a fiber-optic device in accordance with the present description and a curve representing an example of a strain axial profile of an optical fiber of a device according to FIG. 7A;

DETAILED DESCRIPTION

In accordance with a first aspect, the present description relates to a fiber-optic device having a high Brillouin threshold. The device comprises an optical fiber suitable for the propagation of a signal beam of high optical power, for example a single-frequency signal beam or a signal beam having a spectral width less than 100 GHz, and means for coupling a signal beam into an entry end of the optical fiber. The device further comprises a tubular structure making it possible to maintain the optical fiber in a compressive state at room temperature and without other external stresses. To be more precise, the tubular structure includes at least one first tube and at least one first adhesive material, at least a portion of the optical fiber being immobilized in the tubular structure by means of the first adhesive material, adhering to the internal surface of the first tube and to the external surface of the optical fiber. This original structure makes it possible to maintain the optical fiber in a compressive state over all the length immobilized in the tubular structure and with no risk of buckling, the strain of the optical fiber having a maximum absolute value greater than 0.3%.

FIGS. 3 to 5 illustrate examples of tubular structures 10 of a device in accordance with the present description in which an optical fiber 101 maintained in a compressive stress state is immobilized.

Figure 1A:
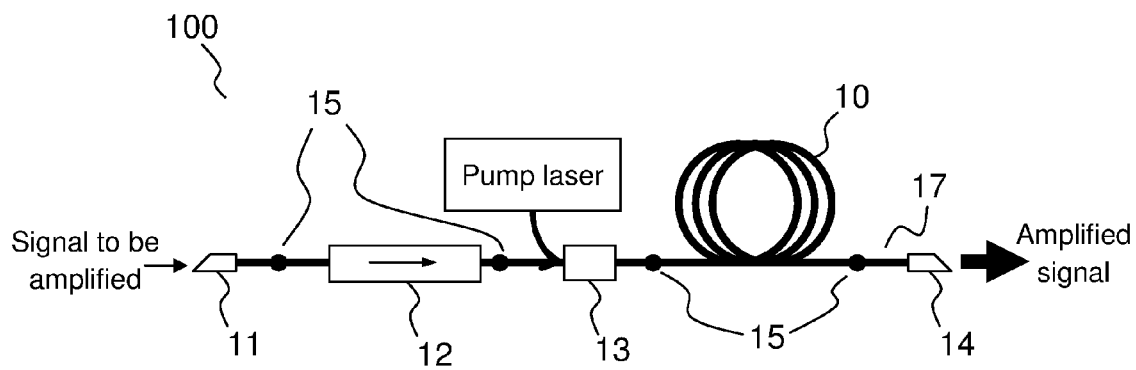
FIGS. 1A and 1B, schematics of a prior art fiber amplifier adapted to operate in copropagative mode and contrapropagative mode, respectively (already described)
Figure 1B:
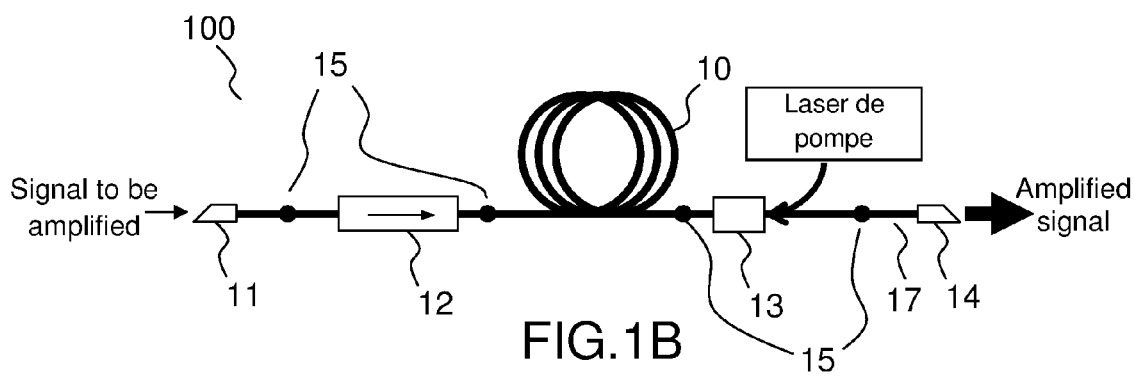
Figure 2:
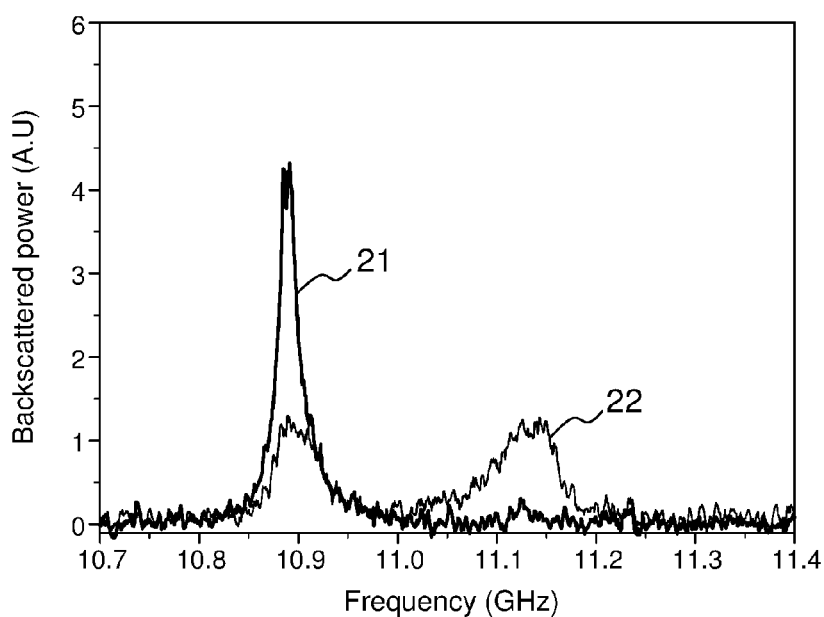
FIG. 2, experimental curves showing the spectral trend of the Brillouin gain in two optical fibers, one without stress and the other stretched over a portion of its length (already described)

The optical fiber 101 comprises a core 111 with refractive index $n_1$ and cladding 112 with refractive index $n_2$, for example silica cladding. The optical fiber 101 may also comprise a protective jacket, for example a polymer material jacket, having a refractive index $n_3$ (not shown in FIGS. 3 to 5). In accordance with an embodiment, the polymer protective jacket of the optical fiber is removed beforehand with a view to its immobilization in the tubular structure. An incident signal beam in the fiber-optic device is coupled into the core 111 of the fiber 101 by coupling means of known type, for example as described above with reference to FIGS. 1A and 1B. When the device is a fiber-optic amplifier, the core of the optical fiber is doped, for example with rare earth ions. A pump beam may be coupled (into the core or into the cladding) at the beginning of the fiber (copropagative pumping) or at the end of the fiber (contrapropagative pumping). The silica cladding of some types of optical fiber may include a layer for guiding the pump beam. In some types of optical fiber the protective jacket can make it possible to guide the pump beam; in this case, the condition $n_3 < n_2$ is complied with. As a general rule, the polymer for the protective jacket may be part of various families (polyamides, polyacrylates, . . . ) with different mechanical properties. In the remainder of the description, of interest will be the mechanical properties of the optical fiber as a whole and an equivalent Young's modulus $E_1$ of the optical fiber 101 will be defined in the following manner. Consider a length of silica section fiber S, optionally surrounded by a polymer protective jacket, and of unstressed length L, the length of which after deformation by a force F becomes L+ΔL. The equivalent Young's modulus is then defined as follows:

$$E_1 = \left(\frac{\Delta L}{L}\right)^{-1} \frac{F}{S}$$

In the above equation, the possible contribution of the polymer material protective jacket is negligible.

Figure 3A:
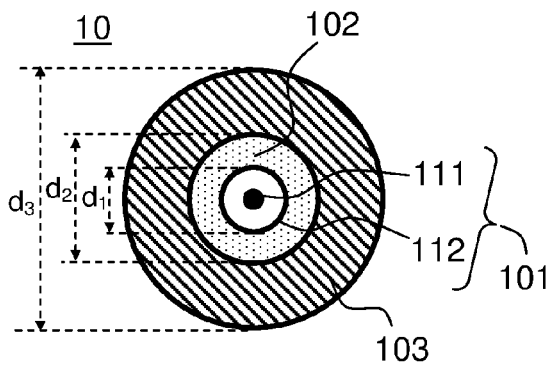
FIGS. 3 to 5, schematics representing examples of tubular structures of a fiber-optic device in accordance with the present description and curves representing strain radial profile examples for each of the tubular structures.
Figure 3B:
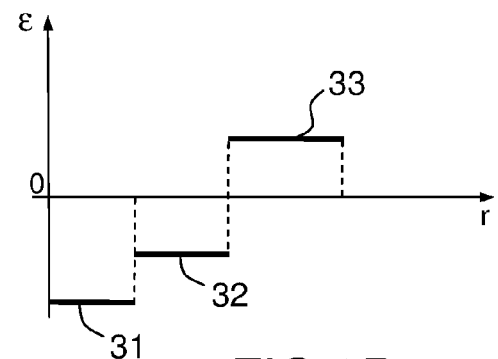

FIG. 3A illustrates a first example of a tubular structure of a fiber-optic device in accordance with the invention. The optical fiber 101 of outside diameter $d_1$ is placed inside a tube 103 of outside diameter $d_3$ and inside diameter $d_2$. The space between the tube and the fiber is filled with an adhesive material 102. The filling is advantageously as complete and as uniform as possible. The adhesive material may be a glue or a resin, for example. FIG. 3B illustrates the radial profile of the strain ϵ of the various elements of the structure. The fiber is placed in a compressive stress state (negative strain represented by the segment 31). The tube is in a positive strain state (i.e. stretched), or even zero strain state, represented by the segment 33 in FIG. 3B. The adhesive material 102 is in an intermediate compressive state between that of the optical fiber and that of the tube (segment 32). The tube has a stiffness sufficient to maintain the optical fiber and the adhesive material in compression. For its part, the adhesive material makes it possible to limit very considerably buckling of the optical fiber. In fact, an optical fiber subjected to compressive stresses tends to buckle with the result that a portion of its axis assumes the shape of a helix. The applicant has demonstrated that by choosing a sufficiently rigid adhesive material, typically having a Young's modulus greater than or equal to 200 MPa, preferably 500 MPa, the optical fiber is able to withstand negative strains having an absolute value greater than 0.7% without buckling, i.e. with a small deviation of its axis relative to the initial position, rendering the bending losses negligible in the target applications (typically less than 0.5 dB/m).

Figure 4A:
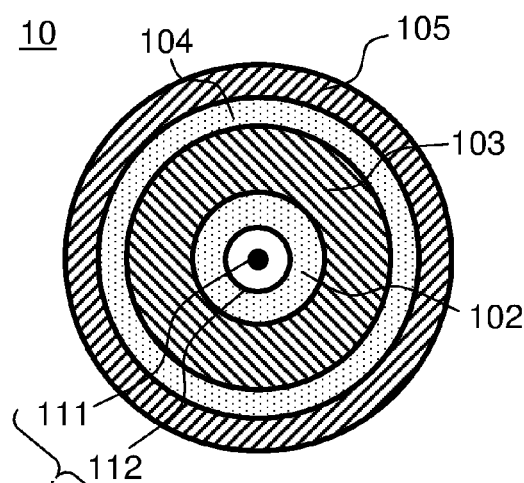
Figure 4B:
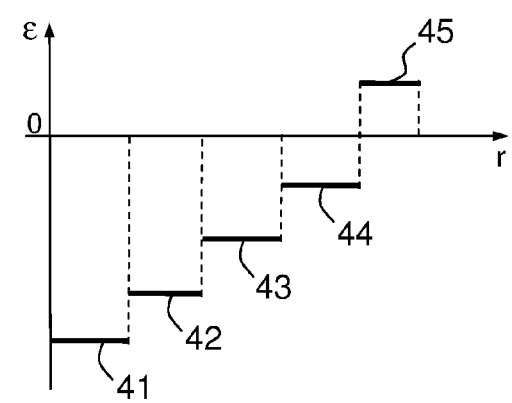

FIG. 4A illustrates a second example of a tubular structure of a fiber-optic device according to the invention. As in the previous example, the optical fiber is maintained in a compressive state in a first tube 103 by means of a first adhesive material 102. In this example the tubular structure 10 comprises a second tube 105 with the tube 103 inside it. The second tube 105 itself maintains the first tube 103 in compression, making it possible to increase the compression stress on the optical fiber situated in the central area of the structure. The space between the first tube 103 and the second tube 105 is filled with a second adhesive material 104. FIG. 4B represents an example of the radial profile of the strain ϵ of the various elements of the structure represented in FIG. 4A. The tube 105 is in a positive strain state (i.e. stretched) or even a virtually zero strain state (represented by the segment 45). The tube 103 is in a compressive stress state (state 43). The optical fiber is in a compressive stress state (state 41). The first adhesive material 102 and the second adhesive material 104 are in intermediate compressive states (respectively 42, 44), the strain being respectively between that of the optical fiber 101 and the first tube 103 and that of the first tube 103 and of the second tube 105. This tubular structure is not limited to two tubes. It makes it possible to increase the compression of the optical fiber situated at the center of the structure, notably if the maximum compression that can be induced by the first tube to the optical fiber is insufficient.

Figure 5A:
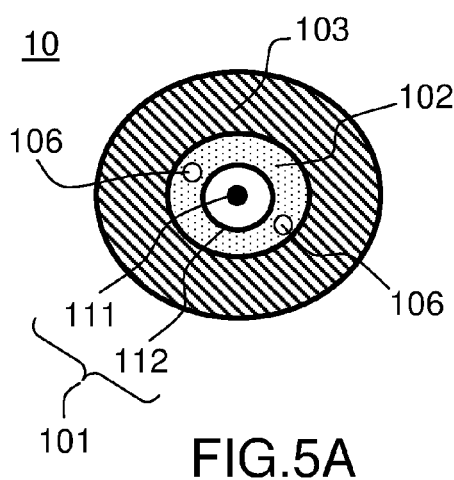
Figure 5B:
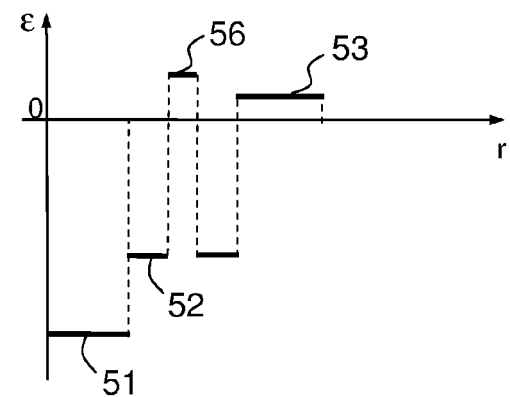

FIG. 5A illustrates a third example of a tubular structure of a fiber-optic device according to the invention. The optical fiber 101 is maintained in a compressive state in the tube 103 by means of the adhesive material 102. In this example the tubular structure 10 further comprises reinforcing elements 106, for example two silica fiber portions placed in the space between the tube 103 and the optical fiber 101 and immobilized by the adhesive material 102. As is apparent in FIG. 5B showing the radial profile of the strain ϵ of the various elements of the structure, the tube 103 is in a (possibly very low) tension stress state. The reinforcing elements 106 are in a tension stress state or are very weakly stressed longitudinally (state 56). The optical fiber is in a compressive stress state (state 51). The adhesive material is in a compressive stress state (state 52) between that of the optical fiber and that of the tube 103. In this example the compression is essentially induced by the reinforcing elements which have a stiffness (equal to the product of their section by their Young's modulus) greater than that of the tube. The adhesive material that adheres to the exterior surface of the optical fiber 101, to the internal surface of the tube 103 and to the external surface of the reinforcing elements 106 arranged in the internal space formed between the optical fiber 101 and the internal surface of the tube 103 makes it possible to limit buckling of the optical fiber even for strains of high absolute value.

FIGS. 6A and 7A represent two embodiments of devices in accordance with the present description showing only the optical fiber and the tubular structure.

In these embodiments, the optical fiber of total length L comprises at least two runs, a first run $10_A$ of length $L_1$ that is not compressed and a second run of length $L-L_1$ that is compressed by means of a tubular structure $10_B$, for example of the type described by means of the foregoing examples. FIGS. 6B and 7B respectively show the strain $\epsilon_f$ of the optical fiber along the optical axis z of the optical fiber.

In the FIG. 6A example, the optical fiber is maintained in a substantially uniform compressive state in the second run $10_B$. FIG. 6B represents the distribution profiles $61_A$ and $61_B$ of the strain $\epsilon_f$ of the optical fiber for the runs $10_A$ and $10_B$, respectively. In this example, the distribution is substantially uniform over each run but has a different strain value, respectively zero and negative. Each run is therefore characterized by a different Brillouin frequency. The run $10_A$ has a Brillouin frequency $v_{B,1}=v_B^{ref}$. The run $10_B$ has a Brillouin frequency $v_{B,2}=v_B^{ref}+K\epsilon_f$. If in this example the compression to which the run $10_B$ is subjected is such that the difference $\delta v_B=v_{B,1}-v_{B,2}=K\epsilon_f$ is greater than the Brillouin gain width $\Delta v_B$, there is obtained a reduction of the effective length over which the Brillouin amplification is cumulative compared to the situation in which the fiber would undergo a constant deformation over its length. Finally, the Brillouin threshold is raised by 3 dB if the length of each run is optimized. The raising of the Brillouin threshold relative to the situation without stress would be identical if $\delta v_B$ were greater than $\Delta v_B$. An example of this kind may be generalized to an arbitrary number of segments the strains of which are such that the Brillouin frequency difference measured at two points belonging to two distinct segments is greater than $\Delta v_B$. The segments may have their length optimized to raise the Brillouin threshold for a given longitudinal distribution of power. The compression applied in the fiber in each of the runs may also be optimized.

In the FIG. 7A example, the optical fiber is maintained in a non-uniform compressive state in the second run $10_B$. FIG. 7B represents diagrammatically the distribution profiles $71_A$ and $71_B$ of the strain $\epsilon_f$ of the optical fiber for the runs $10_A$ and $10_B$, respectively. In this example, the distribution is not uniform over the run $10_B$ with the result that the Brillouin frequency over this segment varies more than the Brillouin gain width $\Delta v_B$. If the strain $\epsilon_f(z)$ imposed on the optical fiber at a position z varies sufficiently along the run for the local Brillouin frequency $v_B(z)$ to vary by more than $\Delta v_B$, the Brillouin threshold is raised directly.

A longitudinal variation of the stress along a run of fiber placed in a tube can be produced by using a tube the characteristics of which vary longitudinally along the latter. For example, the inside or outside diameter of the tube or the Young's modulus or the eccentricity of the interior hole of the tube 103 (defined as the distance between the center of the internal hole of the tube and the center of the external circumference of the tube) may vary along the latter.

FIG. 7B illustrates an example of a device in which a longitudinal variation of the strain $\epsilon_f(z)$ is produced by varying the position of the optical fiber 101 in the tube 103.

The distribution of the strain $\epsilon_f$ is produced using a tube 103 enclosing an optical fiber 101 the radial position of which in the central hole of the tube varies along the axis of the tube. A small eccentricity of the optical fiber corresponds to a low compression (in terms of absolute value) whereas a large eccentricity corresponds to a greater compression.

In accordance with a second aspect, the present description relates to a method of manufacturing a fiber-optic device having a high Brillouin threshold.

FIGS. 8A to 8D describe an example of a method making it possible to produce a device in accordance with the invention.

Figure 8A:
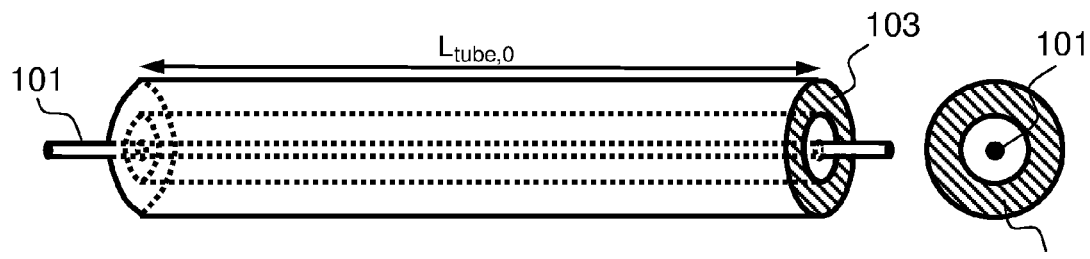
FIGS. 8A to 8D, schematics showing the steps of an example of a method in accordance with the present description of manufacturing a fiber-optic device.
Figure 8B:
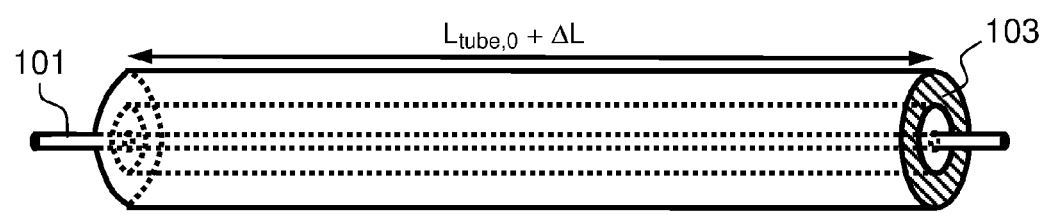
Figure 8C:
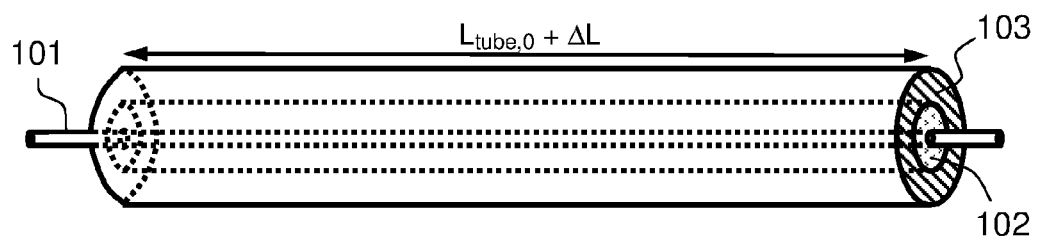
Figure 8D:
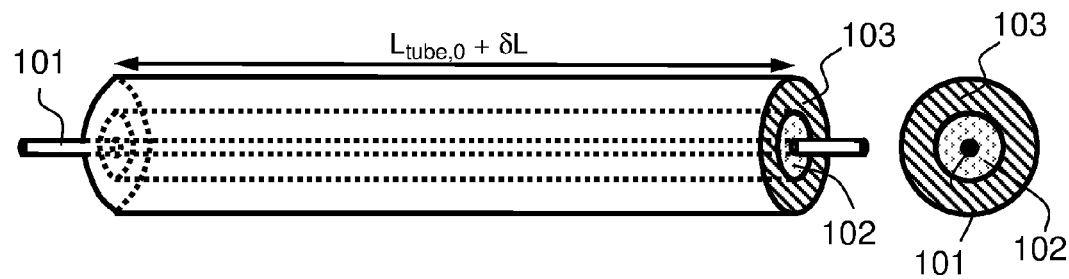

In a first step illustrated in FIG. 8A, the optical fiber 101 of diameter $d_1$ in the silica portion has a section $S_1$ (where $S_1=\pi d_1^2/4$) in its silica portion and an equivalent Young's modulus $E_1$ is placed freely in a tube 103 having inside and outside diameters $d_2$ and $d_3$, respectively, surrounding the latter and of length $L_{tube,0}$, of section $S_3$ (where $S_3=\pi(d_3-d_2)^2/4$) and of Young's modulus of elasticity $E_3$. In a second step, the tube 103 is stretched by a length $\Delta L$. It then measures $L_{tube,0}+\Delta L$ (FIG. 8B). The optical fiber 101 is fastened to the tube 103 by adding an adhesive material 102, for example a glue, to the interior of the tube 103 (FIG. 8C). The adhesive material occupies a section $S_2$ (where $S_2=\pi(d_2-d_1)^2/4$) and is characterized by a Young's modulus $E_2$. After the polymerization of the adhesive material 102, the tube 103 is released and the effect of the return force linked to its elasticity returns it toward its initial position. As the adhesive material and the optical fiber have been placed inside the tube, this return is only partial. The tube then measures a length $L_{tube,0}+\delta L$ with $0<\delta L<\Delta L$. As it returns toward its initial position, the tube therefore transmits compressive stresses to the optical fiber 101 (FIG. 8D).

The initial strain $\epsilon_s$ of the tube is defined as follows:

$$\varepsilon_s = \frac{\Delta L}{L_{tube,0}}$$

Ignoring the effects of shear, the strain $\epsilon_f$ applied to the optical fiber in compression has the value:

$$\varepsilon_f = -\varepsilon_s \frac{1}{1 + \frac{E_2 S_2 + E_1 S_1}{E_3 S_3}} \quad (1)$$

Accordingly, to generate a high $\epsilon_f$ (in terms of absolute value), the requirement is therefore to utilize a tube such that the product $E_3 S_3$ is large compared to the sum of the products $E_2 S_2 + E_1 S_1$.

Moreover, the tube must also have a high elastic limit so that after application of the deformation $\epsilon_s$ the tube returns into place. In order to determine the appropriate materials, the equation (1) may be used and the elastic limit of the material used for the tube taken for $\epsilon_s$. We have found that materials such as polyamides or polycarbonates are particularly appropriate. In fact their elastic limit is greater than 1% and their Young's modulus is greater than 1 GPa.

An appropriate material for the tube should have a high elastic limit but also allow the complete assembly formed of the tube, the optical fiber and the adhesive material to have a low modulus of stiffness in bending (typically less than 10000 N·mm²). This property in fact enables the tubular structure to be curved easily. It can therefore be coiled with a diameter compatible with devices of reasonable size (radius of curvature less than 25 cm) or enable connection between two points without being constrained to a straight line path. The modulus of stiffness in bending may be calculated for a structure in which the tube and the fiber are concentric, for example, and in which the space between the fiber and the internal boundary of the tube is completely filled with adhesive material, in accordance with the expression:

$$EI = \frac{1}{64}[E_1 \pi d_1^4 + E_2 \pi (d_2^4 - d_1^4) + E_3 \pi (d_3^4 - d_2^4)]$$

in which $E_3$ designates the Young's modulus of the tube, $E_2$ the Young's modulus of the adhesive material, $E_1$ the equivalent Young's modulus of the silica fiber, and $d_3$ designates the outside diameter of the tube, $d_2$ the diameter of the glued portion and thus the inside diameter of the tube, and $d_1$ the diameter of the silica fiber portion.

Figure 9:
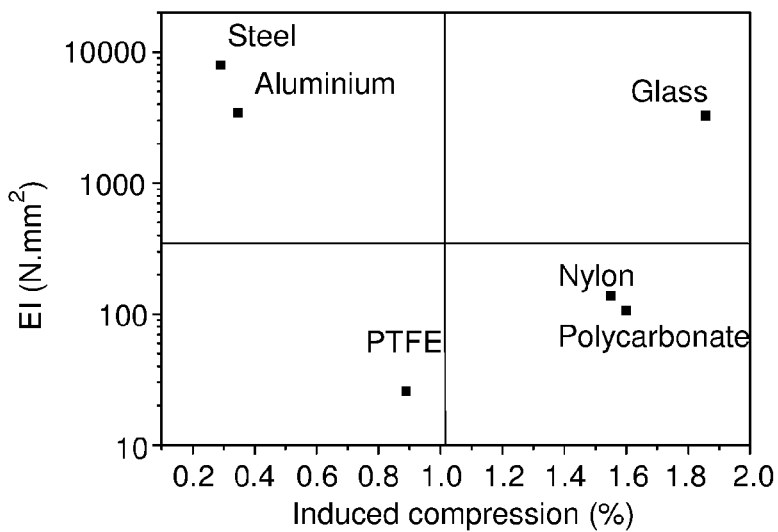
FIG. 9, a diagram showing the modulus of stiffness and the strain induced for various materials suitable for the production of a tube of the tubular structure in accordance with the present description.

FIG. 9 compares the modulus of stiffness in bending and the maximum compression $\epsilon_f$ transferred to the fiber to be compressed at the elastic limit of the tube for various examples of materials of the type: polyamide, polycarbonates, polytetrafluoroethylene (PTFE), silica glass, aluminum, steel. The maximum deformation transferred is calculated from equation (1) using for the elongation $\epsilon_s$ of the tube the plastic limit beyond which the deformation is no longer more than 90% reversible. It has been assumed for calculating EI that $d_1$=125 µm, $d_2$=500 µm, $d_3$=1 mm, $E_1$=70 GPa, $E_2$=1 GPa. The most appropriate materials are characterized by a low modulus of stiffness EI and a high induced compression. This therefore means the bottom right-hand quadrant of FIG. 9. It is seen in particular that polyamides (nylon) and polycarbonates have adequate properties.

It is advantageous to choose the section of the tube (and thus the inside and outside diameters in the case of a cylindrical tube) to maximize the absolute value of $\epsilon_f$ in equation (1). The section of the tube should not be too large, however, in order to enable the tube to adopt a radius of curvature of the order of 25 cm, for example. The minimum radius of curvature of a tube of outside diameter $d_3$ made from a material with Young's modulus E that can tolerate a maximum stress $\sigma_{max}$ has the approximate value $R_c$=s E $d_3/2/\sigma_{max}$ where s is a safety margin. Depending on the applications and the service life concerned, there could be adopted for $\sigma_{max}$ the elastic limit or the yield strength and a safety factor s between 1 and 10. There could typically be imposed a minimum radius of curvature equal to 10 times (for polycarbonates) to 100 times (for glass) the outside diameter of the tube.

Moreover, the adhesive material is advantageously characterized by a high modulus $E_2$ in order to oppose buckling of the fiber. An adhesive material will typically be chosen such that $E_2 \geq 200$ MPa, advantageously $E_2 \geq 500$ MPa, advantageously $E_2 \geq 1$ GPa. The adhesive material may advantageously be charged with fibers of glass or other materials intended to increase its Young's modulus. Similarly, the material constituting the tube could be charged in order to increase its elastic limit.

As indicated above, it is advantageous to use a device in accordance with the invention in which the compressive stresses applied to the fiber vary along the device.

In accordance with an embodiment, a technique that may be utilized to generate compressive stresses that vary along the tube 103 consists in polymerizing the adhesive material situated in different areas of the tube by applying different elongations $\epsilon_s$ in those different areas.

Figure 10:
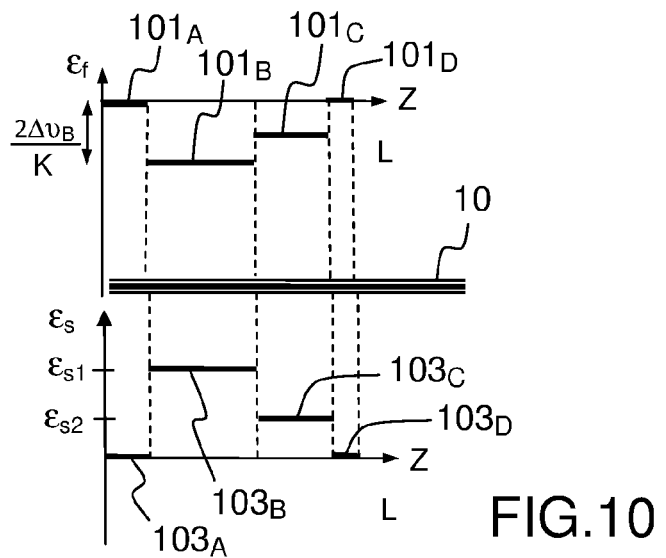
FIG. 10, schematics respectively showing the axial profile of the strain of an optical fiber and of a tube of a tubular structure in which the fiber is immobilized in accordance with an embodiment method in accordance with the present description of manufacturing a device.

FIG. 10 illustrates an embodiment in which different elongations are applied in different segments of the tube bearing the references $103_A$, $103_B$, $103_C$, $103_D$ in this example. For example, the adhesive material situated at an end $103_A$ may be polymerized without stretching the tube after which the adhesive material situated in the first portion $103_B$ of the tube is polymerized when the latter is under tension $\epsilon_{s1}$, which is followed by reducing the applied tension to a value $\epsilon_{s2}$ when polymerizing the second part $103_C$. Finally, the tube is released completely before polymerizing the other end $103_D$. After releasing the tube, the optical fiber is in a compressive state characterized by a strain profile $\epsilon_f$ where $\epsilon_f$ and $\epsilon_s$ are linked by equation (1). In this example, the profile of the strain $\epsilon_f$ of the optical fiber comprises four runs $101_A$, $101_B$, $101_C$, $101_D$ corresponding to the runs $103_A$, $103_B$, $103_C$, $103_D$. In the areas in which the tube has been stretched ($103_B$, $103_C$), the fiber is compressed after releasing the tube ($101_B$, $101_C$).

Numerous embodiments are possible for the method of manufacturing a device in accordance with the present description.

In particular, the steps consisting in filling the tube with adhesive material and stretching the tube when the optical fiber has been placed in the tube, may be carried out in any chronological order.

Moreover, in the case of stretching the tube in a manner that is variable run by run, as illustrated by means of FIG. 10 for example, it is possible to proceed with the polymerization of the adhesive material area by area, the stretched portion of the tubular structure being released as the area of polymerization of the adhesive material is moved along. Alternatively, the filling of the internal space of the tubular structure with the adhesive material being carried out before stretching the tubular structure, the adhesive material may be polymerized area by area and the tubular structure stretched as the area of polymerization of the first adhesive material is moved along.

In accordance with an embodiment, it is possible to produce a tubular structure adapted to compress an optical fiber placed in the internal space of a first tube by the means described above and then to position that first tube in a second tube and to reproduce the operations of stretching the second tube, filling the internal space of the second tube with a second adhesive material, polymerizing the second adhesive material and releasing the second tube so that the second tube confers a compression on the first tube. A device of the type represented in FIG. 4A is then obtained. The fiber with Young's modulus $E_1$ and section $S_1$, the first adhesive material with Young's modulus $E_2$ and section $S_2$, and the first tube with Young's modulus $E_3$ and section $S_3$ form a first tubular structure. Its equivalent Young's modulus may be defined as follows $E=(E_1 S_1 + E_2 S_2 + E_3 S_3)/(S_1 + S_2 + S_3)$ and its section as follows $S=S_1 + S_2 + S_3$. The second tube with Young's modulus $E_5$ and section $S_5$ and the second adhesive with Young's modulus $E_4$ and section $S_4$ will be chosen so that the ratio $(E_4 S_4 + ES)/E_5 S_5$ is as small as possible.

In accordance with an embodiment, it is possible to produce a tubular structure in which reinforcing elements (106, FIG. 5A) are placed in the internal space of the tube 103. The reinforcing elements, and optionally also the tube could then be stretched. After polymerizing the adhesive material in which the reinforcing elements are embedded and releasing the tension the optical fiber is compressed. The reinforcing elements will preferably be in a state of tension after releasing the tubular structure. The reinforcing elements are characterized by their Young's modulus $E_6$ and their total section $S_6$. It is preferable to choose them so that $E_6S_6$ is large compared to $E_1S_1$ and $E_2S_2$. For the effect of the reinforcing elements to be meaningful, it is preferable for $E_6S_6$ to be equal to at least 25% of the product $E_3S_3$. The reinforcing elements may be optical fibers, for example.

In the fiber-optic device produced by means of the method in accordance with the present description, a number of layers characterized by different mechanical properties are in adhesive contact. As their Young's moduli have significantly different values here, stresses may exist near the interfaces. For example, in the case of an optical fiber including a polymer jacket, the polymer jacket could be chosen so that the adhesion of the polymer to the fiber is greater than the shear stresses exerted at the polymer/fiber interface. Ormocer® polyamide typically has adequate properties for the polymer protective jacket. In the case of using polymers with a low index, which are known to be generally less strong than polymers with a high index, it would be beneficial to take as small as possible a thickness of low-index polymer. This low-index polymer may itself be covered with a polymer of higher modulus and higher index. Similarly, the adhesive material used to assemble the fiber and the tube is advantageously selected for its good properties of adhesion to the polymer of the fiber and the material forming the tube.

In accordance with an embodiment of the invention that contributes to reducing further the risks of delamination, the stress $\epsilon_f$ imposed on the optical fiber by the tube may be chosen to be zero or less than 0.3% in the vicinity of each of the two ends of the fiber. It then increases over a characteristic length greater than a few centimeters and then decreases toward the end of the fiber to become less than 0.3% again at the other end. This embodiment makes it possible to reduce the shear forces that are exerted at the interfaces between the various layers. This reduces the risk of delamination.

Figure 11:
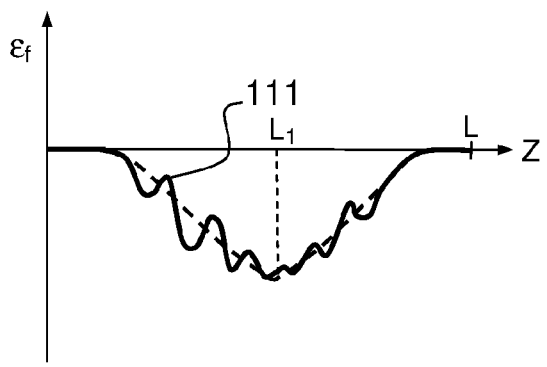
FIG. 11, a curve showing the axial profile of the strain of an optical fiber, in accordance with an embodiment method in accordance with the present description of manufacturing a device.

FIG. 11 represents an example of such a stress profile. In this example the profile 111 of the strain of the fiber has an absolute value of the strain less than 0.3% at the ends and a triangular envelope in the central portion (i.e. the profile may have small deviations relative to the triangular profile).

In the case of a fiber-optic amplifier, for example, if the maximum of the triangular envelope is reached at $L_1=xL$, it can be shown that when the power of the signal beam increases in accordance with a distribution $P(z)$ $0 \leq z \leq L$ that approximates an affine distribution, it is advantageous to choose x close to 0.5, for example $0.4 \leq x \leq 0.6$. This situation is often produced for copropagative pumping in the cladding. If the power increases in accordance with a distribution $P(z)$ that approximates an exponential distribution, it is advantageous to choose x close to 0.8, for example $0.5 \leq x \leq 0.9$. This situation is often produced for contrapropagative pumping in the cladding or pumping in the core.

Figure 12:
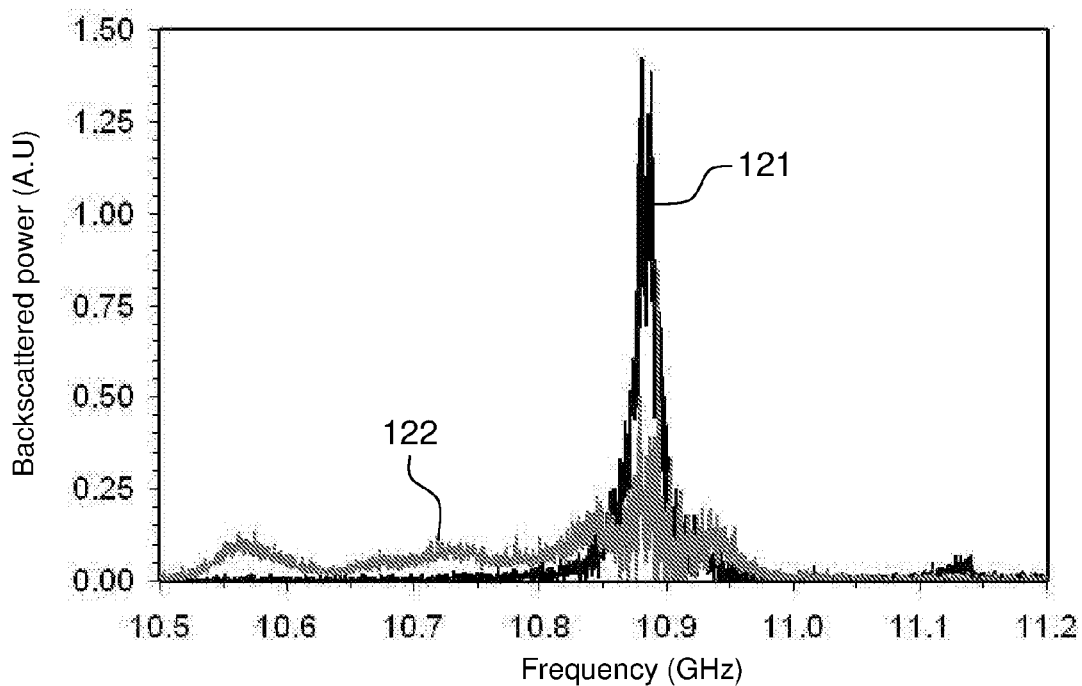
FIG. 12, experimental curves illustrating spectral trend of the Brillouin gain in a first embodiment of an optical fiber intended for optical communication, respectively in a first case in which the optical fiber is stress-free and in a second case in which the optical fiber is immobilized in a tubular structure in accordance with the present description.
Figure 13A:
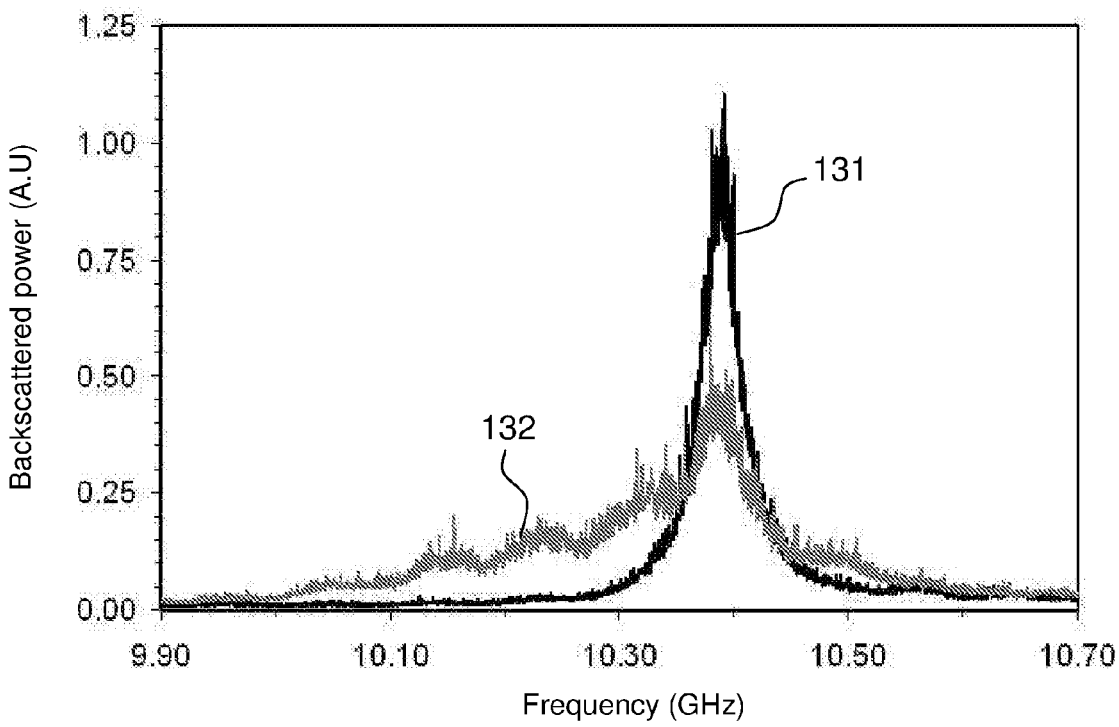
FIG. 13A, experimental curves illustrating the spectral trend of the Brillouin gain in a second embodiment of an optical fiber intended for optical amplification, respectively in a first case in which the optical fiber is stress-free and in a second case in which the optical fiber is immobilized in a tubular structure in accordance with the present description, and FIG. 13B a schematic illustrating, in accordance with an example, the shape of the output pulses of the optical amplifier in the first and second cases.
Figure 13B:
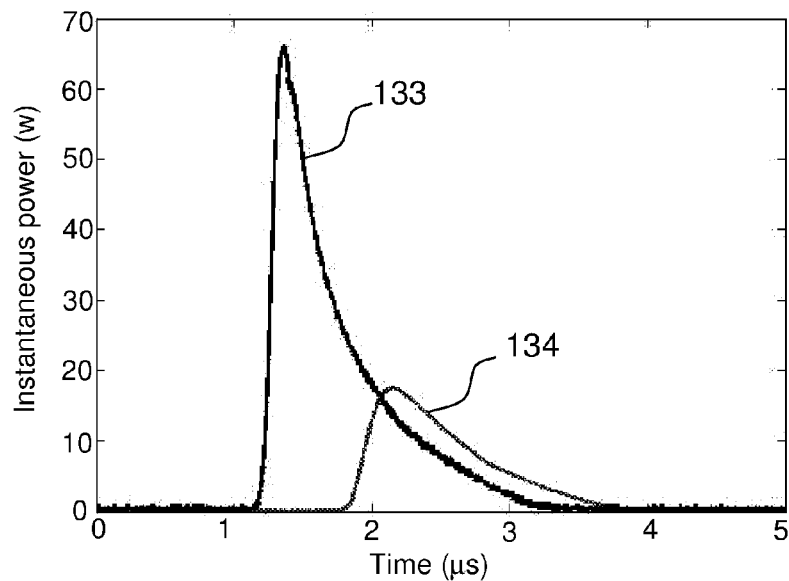
Figure 14:
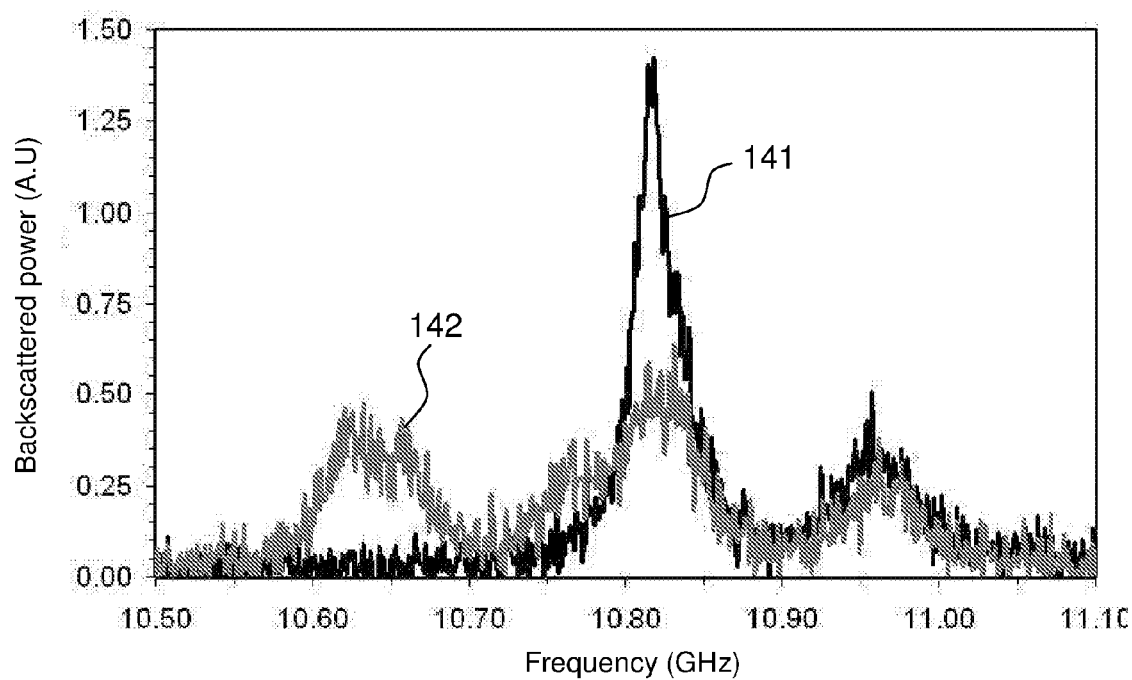
FIG. 14, experimental curves illustrating the spectral trend of the Brillouin gain in a third embodiment of an optical fiber intended for optical communication, respectively in a first case in which the optical fiber is stress-free and in a second case in which the optical fiber is immobilized in a tubular structure in accordance with the present description.

FIGS. 12 to 14 illustrate experimental results obtained in accordance with three configurations of a device in accordance with the present description, the parameters for each of these configurations being summarized in table 1 below. For each of these examples, the tubular structure is of the type represented in FIG. 3A, with a polyamide 11 (hereinafter designated PA11) type nylon tube.

TABLE 1

Definition of the various configurations.

| Config. | Fiber | $\Phi_{core}$ | $\Phi_{coating}$ | Tube $\Phi_{inside}$ | Tube $\Phi_{outside}$ |
|---|---|---|---|---|---|
| 1 | Passive | 10 μm | 250 μm | 1 mm | 2 mm |
| 2 | Active Er/Yb | 7.5 μm | 250 μm | 1 mm | 2 mm |
| 3 | Passive | 10 μm | 250 μm | 500 μm | 900 μm |

FIG. 12 illustrates experimental results obtained with the first configuration.

The optical fiber is a standard polarization maintaining 1550 nm monomode fiber. The diameter of the core is approximately $\Phi_{core}=10$ μm, that of the cladding is 125 μm and that of the protective polymer is $\Phi_{coating}=250$ μm. This 2.3 m long optical fiber is placed in a PA11 nylon tube with an inside diameter of 1 mm and an outside diameter of 2 mm. The Young's modulus $E_3$ of this tube is between 1 and 5 GPa inclusive. The 2 m long tube is stretched by 1.5%. The adhesive material injected into the tube is a UV polymerizable adhesive material characterized by a Young's modulus $E_2=1100$ MPa. Once the tube is released, the fiber is in a compressive state, which may be characterized by heterodyne detection by causing the backscattered Stokes wave to beat with the signal to be amplified. This characterization is effected in a continuous regime (the wavelength of the signal beam is 1545.3 nm).

FIG. 12 therefore shows a curve 121 illustrating the Brillouin gain on the unstretched optical fiber and the Brillouin gain 122 on the compressed optical fiber.

It is apparent that the Brillouin spectrum is not purely and simply shifted in frequency by the compression. The spectrum tends more to be spread. This is explained by the imperfections of the tube (characterized by large fluctuations in the position of the center of the interior hole relative to the position of the center of its exterior circumference curve) and local creep of the tube when it is stretched. This spreading has an advantage for the present invention. The maximum shift observed is 300 MHz, i.e. ten times the mid-height width of the Brillouin gain. We have measured that in this configuration the Brillouin threshold was raised by 5.7 dB.

FIGS. 13A and 13B illustrate experimental results obtained with the second configuration.

In this second configuration, the fiber is an erbium/ytterbium co-doped fiber. Here it is a question of showing the situation of the amplification of a pulsed signal beam of narrow spectral width. The active fiber used measures 3.5 m and its core diameter is 7.5 μm. The signal beam (wavelength 1545.3 nm) and the pump beam (wavelength 975 nm) are respectively coupled into the core and the cladding of this fiber using a fiber pump combiner (in accordance with an arrangement similar to the amplifiers shown in FIGS. 1A, 1B, for example). A fiber isolator is welded to the other end of the active fiber. The end of the active fiber is inserted in a 2.25 m long PA11 nylon tube. The inside diameter of the tube is 1 mm and the outside diameter is equal to 2 mm. The Young's modulus $E_3$ of this tube is between 1 and 5 GPa inclusive. The tube is characterized by large fluctuations in the position of the center of the interior hole relative to the position of the center of its exterior circumference. The tube is stretched by 1.5% i.e. 3.4 cm. The adhesive material injected into the tube is a UV polymerized adhesive material characterized by a Young's modulus $E_2$ of 1100 MPa. Once the tube is released, the fiber is in a compressive state that may be characterized by the backscattered Stokes wave that is obtained by continuous heterodyne detection. Observation of the tubular structure obtained in this way shows that the position of the fiber within the central hole of the tube also fluctuates along the latter.

FIG. 13A therefore shows a curve 131 illustrating the Brillouin gain on the unstressed optical fiber and the Brillouin gain 132 on the compressed optical fiber.

The same remark applies as for the first configuration, the Brillouin spectrum is not purely and simply shifted in frequency. The portion centered around 10.39 GHz essentially corresponds to the Brillouin spectrum of the unstressed fiber portion (1.25 m). A frequency shift greater than 300 MHz is observed.

In a pulsed (output pulse duration 420 ns and repetition rate 10 kHz) and single-frequency regime, a peak power of 66 W has been achieved. Without this stress applied to the fiber, the maximum peak power achieved is 17.5 W (for pulses of output duration 770 ns and a repetition rate of 10 kHz), which represents a peak power gain of 5.7 dB. The pulses 134 emitted by an unstressed fiber amplifier and the pulses 133 emitted by a compressed fiber amplifier are shown in FIG. 13B.

FIG. 14 shows the experimental results obtained with the third configuration.

In this third configuration the optical fiber is again a standard polarization maintaining 1550 nm passive fiber. The core diameter is approximately 10 μm, that of the cladding is 125 μm and that of the protective polymer is 250 μm. This 2 m long optical fiber is placed in a PA11 nylon tube having an inside diameter of 0.5 mm and an outside diameter of 0.9 mm. The Young's modulus $E_3$ of this tube is between 1 and 5 GPa inclusive. The 1.8 m long tube is stretched by 1%. The adhesive material injected into the tube is a UV polymerized adhesive material characterized by a Young's modulus $E_2$ of 1.4 GPa. Once the tube is released, the fiber is in a compressive state, which may be characterized by heterodyne detection by causing the backscattered Stokes wave to beat with the signal to be amplified. This characterization is effected in a continuous regime (the wavelength of the signal beam is 1545.3 nm).

FIG. 14 therefore shows a curve 141 illustrating the Brillouin gain on the unstretched optical fiber and the Brillouin gain 142 on the compressed optical fiber.

In the present case, the Brillouin spectrum is frequency shifted by the compression. The maximum shift observed is 180 MHz, i.e. more than five times the mid-height width of the Brillouin gain.

In the FIG. 14 example, the fiber has less room in the central hole for its position to fluctuate relative to the tubes used for the first and second configurations. Moreover the position of the center of the internal hole fluctuates less than in the first and second configurations. In this third configuration, the tube shows no sign of localized creep. The result of this is less fluctuation in the strain suffered by the fiber. It is for this reason that the Brillouin spectrum obtained is a shifted version of the spectrum of the unstressed fiber. In contrast, in the FIG. 12 example, the fluctuations spread the spectrum. In order to raise the Brillouin threshold a number of runs produced in accordance with the FIG. 14 example may be juxtaposed so that the Brillouin peak is shifted between runs by more than approximately 30 MHz. On the other hand a run produced in accordance with the FIG. 12 example will of itself see its Brillouin threshold raised.

The use of tubes characterized by fluctuations of the centre of the inside and outside diameters and/or an internal hole having an inside diameter greater than 1.5 times the outside diameter of the fiber is therefore of benefit for obtaining a variable stress along the tube and therefore a widened Brillouin spectrum and a raised Brillouin threshold.

In all the configurations described, the tubular structure retains a small overall size and can be connected easily, making it possible to preserve the flexibility of use of the optical fibers. The device in accordance with the present invention therefore represents a great benefit for the amplification of signals or for producing connectors or providing fiber inputs or outputs for components intended to transport signals of high power and narrow spectral width.

Although described by way of a certain number of detailed embodiments, the structure of and the method of manufacturing the fiber-optic device in accordance with the invention encompass different embodiments, modifications and improvements that will be obvious to the person skilled in the art, it being understood that these various embodiments, modifications and improvements are within the scope of the invention as defined by the following claims.

The invention claimed is:

1. A fiber-optic device having a high Brillouin threshold comprising:
    an optical fiber suitable for the propagation of a signal beam of high optical power and having an external surface;
    means for coupling a signal beam into an entry end of the optical fiber; and
    a tubular structure comprising at least one first tube with an internal surface and at least one first adhesive material, wherein:
    at least one portion of the optical fiber is immobilized in the tubular structure by the first adhesive material adhering to the internal surface of the first tube and to the external surface of the optical fiber, and
    at room temperature and with no other external stresses on the device, the immobilized portion of the optical fiber is maintained in a compressive state by the tubular structure, such that the strain of the optical fiber is negative or zero in its portion immobilized in the tubular structure, the maximum absolute value of the strain of the immobilized portion of the optical fiber being greater than 0.3%.

2. The fiber-optic device as claimed in claim 1, wherein the immobilized portion of the optical fiber has a compressive state with a strain profile that is variable along said immobilized portion.

3. The fiber-optic device as claimed in claim 2, wherein the strain profile of the optical fiber is such that the strain of the immobilized portion of the optical fiber is comprised between −0.3% and 0.3% in the vicinity of each end of the optical fiber.

4. The fiber-optic device as claimed in claim 1, wherein the Young's modulus of the first adhesive material is greater than or equal to 200 MPa.

5. The fiber-optic device as claimed in claim 1, wherein the material forming the first tube belongs to the family of polycarbonates or polyamides.

6. The fiber-optic device as claimed in claim 1, claims, wherein the first adhesive material is polymerized by light radiation of given activation wavelength and the first tube is at least partially transparent at said activation wavelength.

7. The fiber-optic device as claimed in claim 1, wherein, $E_1$ being the equivalent Young's modulus of the optical fiber, $E_2$ and $E_3$ being the respective Young's moduli of the first adhesive material and the first tube, $S_1$ being the section of the optical fiber, $S_2$ and $S_3$ being the respective sections of the first adhesive material and the first tube, the condition $E_1S_1+E_2S_2<E_3S_3$ is complied with.

8. The fiber-optic device as claimed in claim 1, wherein the tubular structure comprises at least one second tube and at least one second adhesive material, wherein:
   the first tube is immobilized in the second tube by the second adhesive material adhering to the internal surface of the second tube and to the external surface of the first tube, and
   at room temperature and with no other exterior stresses on the device, the first tube is maintained in a compressive state by at least said second tube.

9. The fiber-optic device as claimed in claim 1, wherein the tubular structure further comprises reinforcing elements contributing to maintaining the optical fiber in said compressive state, the reinforcing elements being positioned in the internal space formed between the external surface of the optical fiber and the internal surface of the tube and immobilized by means of said first adhesive material.

10. The fiber-optic device as claimed in claim 1, wherein the bending stiffness of the tubular structure is less than 10000 N·mm².

11. The fiber-optic device as claimed in claim 1, wherein, the optical fiber being an amplifying optical fiber of given length L, comprising a core and a cladding, and being adapted to amplify a signal beam being propagated in said core, the device further comprises means for coupling a pump beam for pumping said amplifying optical fiber.

12. The fiber-optic device as claimed in claim 11, wherein:
   the pump beam coupling means are adapted to pump the amplifying optical fiber in a copropagative configuration in the cladding, and
   the compressive state of the amplifying optical fiber has a triangular profile with a maximum absolute value at a point situated at a position $L_1=x·L$ where $0.4 \leq x \leq 0.6$.

13. The fiber-optic device as claimed in claim 11, wherein:
   the pump beam coupling means are adapted to pump the amplifying optical fiber in a contrapropagative configuration in the cladding or to pump the amplifying optical fiber in a copropagative or contrapropagative configuration in the core, and
   the compressive state of the amplifying optical fiber has a triangular profile with a maximum absolute value at a point situated at a position $L_1=x·L$ where $0.5 \leq x \leq 0.9$.

14. An amplified master oscillator system comprising:
   a laser emission source of a signal beam;
   a laser emission source of a pump beam; and
   a fiber-optic device as claimed in claim 11 for amplifying said signal beam wherein said pump beam is coupled to the amplifying optical fiber of the device.

15. A method of manufacturing a fiber-optic device having a high Brillouin threshold comprising:
   placing at least a portion of an optical fiber in an internal space of a first tube of a tubular structure;
   stretching at least a portion of the tubular structure;
   filling the internal space of the first tube with a polymerizable first adhesive material;
   polymerizing the first adhesive material; and
   releasing the stretched portion of the tubular structure, leading to compression of the optical fiber.

16. The method of manufacture as claimed in claim 15, wherein the first adhesive material is polymerized area by area and said stretched portion of the tubular structure is released as the area of polymerization of the first adhesive material moves.

17. The method of manufacture as claimed in claim 15, wherein the internal space of the tubular structure is filled with the first adhesive material before stretching the tubular structure, the first adhesive material is polymerized area by area and the tubular structure is stretched as the area of polymerization of the first adhesive material is moved.

18. The method of manufacture as claimed in claim 15, wherein the stretching of at least a portion of the tubular structure comprises stretching the first tube.

19. The method of manufacture as claimed in claim 18, further comprising, after polymerizing the first adhesive material and releasing the stretched first tube:
   placing the first tube in an internal space of a second tube of the tubular structure;
   stretching the second tube;
   filling the internal space of the second tube with a polymerizable second adhesive material;
   polymerizing the second adhesive material; and
   releasing the stretched second tube, leading to compression of the first tube.

20. The method of manufacture as claimed in claim 15, further comprising placing in the internal space of the first tube at least one reinforcing element, the stretching at least a portion of the tubular structure comprising stretching the reinforcing element or elements.

* * * * *